(12) United States Patent
Zhou

(10) Patent No.: US 11,087,198 B2
(45) Date of Patent: Aug. 10, 2021

(54) MINIATURIZED DUAL-RESONANCE ANTI-METAL RFID TAG

(71) Applicant: XERAFY (SHANGHAI) CO., LTD., Shanghai (CN)

(72) Inventor: Lutao Zhou, Shanghai (CN)

(73) Assignee: XERAFY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/848,832

(22) Filed: Apr. 14, 2020

(65) Prior Publication Data

US 2020/0242443 A1   Jul. 30, 2020

Related U.S. Application Data

(63) Continuation of application No. PCT/CN2018/082905, filed on Apr. 13, 2018.

(30) Foreign Application Priority Data

Dec. 25, 2017   (CN) .......................... 201711425421.9

(51) Int. Cl.
*G06K 19/077* (2006.01)
*H01Q 5/30* (2015.01)
*H01Q 1/38* (2006.01)

(52) U.S. Cl.
CPC ... *G06K 19/07773* (2013.01); *G06K 19/0772* (2013.01); *H01Q 1/38* (2013.01); *H01Q 5/30* (2015.01)

(58) Field of Classification Search
CPC ......... G06K 19/07773; G06K 19/0772; G06K 19/07767; G06K 19/07771; H01Q 5/30; H01Q 1/38; H01Q 9/42; H01Q 5/371; H01Q 1/2225
See application file for complete search history.

(56) References Cited

U.S. PATENT DOCUMENTS

| | | | | |
|---|---|---|---|---|
| 6,680,700 B2 * | 1/2004 | Hilgers | .................. | H01Q 1/243 343/700 MS |
| 6,933,894 B2 * | 8/2005 | Ghosh | .................... | H01Q 1/243 343/700 MS |
| 8,678,295 B2 * | 3/2014 | Liu | ....................... | H01Q 9/0442 235/492 |
| 2014/0232608 A1 * | 8/2014 | Zhao | ........................ | H01Q 7/00 343/866 |

* cited by examiner

*Primary Examiner* — Seung H Lee

(57) ABSTRACT

Disclosed herein is a miniaturized dual-resonance anti-metal RFID tag, comprising a dielectric substrate and a microstrip antenna disposed on the surface of the dielectric substrate. The microstrip antenna comprises a first electrode and a second electrode disposed on the front surface of the dielectric substrate with a first slit disposed therebetween, a grounding electrode disposed on the back surface of the dielectric substrate, a feeding electrode disposed on the first side of the dielectric substrate and comprising a first feeding electrode and a second feeding electrode with a second slit disposed therebetween, and wherein: a driving chip is disposed at the second slit, which is coupled to the first and the second feeding electrodes respectively, the first feeding electrode is coupled to the second electrode, the second feeding electrode is coupled to the grounding electrode.

9 Claims, 3 Drawing Sheets

MINIATURIZED DUAL-RESONANCE ANTI-METAL RFID TAG

CROSS-REFERENCE TO RELATED APPLICATIONS

The present application is a Continuation Application of PCT application No. PCT/CN2018/082905 filed on Apr. 13, 2018, which claims the benefit of Chinese Patent Application No. 201711425421.9 filed on Dec. 25, 2017, the contents of the above are hereby incorporated by reference.

FIELD OF THE INVENTION

The present invention relates to the field of RFID tags, more particularly, to a miniaturized dual-resonance anti-metal RFID tag.

BACKGROUND OF THE INVENTION

RFID (Radio Frequency Identification) tags, also known as electronic tags, relate to a radio frequency identification technology, which belongs to a communication technology. With RFID tags, an identification system is able to identify specific targets, read and write related data by virtue of radio signals, without establishing mechanical or optical contact between the identification system and the specific targets. That is to say, RFID tags can be used to perform quick and batch identification and can be used in asset management applications including IT, medical, and tool applications. RFID system typically includes an electric tag and a reader-writer. The electric tag is disposed on an object to be identified, which is used for storing the identity information of the object to be identified. The reader-writer is in wireless communication with the electric tag, so as to write/read the data information to/from the tag. The key element in the whole system is the antenna in the electric tag, whose design and performance, including function distance and consistency and the like, decide the performance of the tag to the most extent.

Under the condition that the development of RFID tag technology becomes mature in the world, requirements on the tag are gradually increased, including small volume, workable under metal condition, at the time that the RFID tag exhibits effective management and convenience. As such, regional ceramics tags with low loss and high dielectric constant are generated based on PIFA antenna (Planar Inverted-F Antenna) principle. However, such regional ceramics tags cannot completely satisfy the global requirements, since the miniaturized ceramics tags have narrow bandwidth, which merely satisfies one frequency band of European frequency bands (866-868 MHz) and American frequency bands (902-928 MHz). Or the ceramics tags cover two frequency bands but have too large volume, such that the tags cannot satisfy hidden antenna requirements. Under certain condition, although the ceramics tags satisfy the requirements on small volume and workable under anti-metal environment, they merely cover one frequency band. With global economic integration, there are more and more needs on global RFID tag antenna, which could manage world-wide asset with small volume and covering two frequency bands, and meanwhile, which is adapted for various metal and non-metal environments.

SUMMARY OF THE INVENTION

Provided herein is a RFID tag, comprising a dielectric substrate and a microstrip antenna disposed on the surface of the dielectric substrate.

The microstrip antenna comprises a first electrode and a second electrode disposed on the front surface of the dielectric substrate with a first slit disposed therebetween, a grounding electrode disposed on the back surface of the dielectric substrate, a feeding electrode disposed on the first side of the dielectric substrate and comprising a first feeding electrode and a second feeding electrode with a second slit disposed therebetween. A driving chip is disposed at the second slit, which is respectively coupled to the first and the second feeding electrodes. The first feeding electrode is coupled to the second electrode and the second feeding electrode is coupled to the grounding electrode.

The microstrip antenna further comprises a third electrode that is electrically coupled to the first and the second electrodes and the grounding electrode.

Alternatively, the RFID tag has a first working frequency band and a second working frequency band.

Alternatively, the first working frequency band spans from 866 Hz to 868 MHz, and the second working frequency band spans from 902 MHz to 928 MHz, or the first working frequency band spans from 902 MHz to 928 MHz, and the second working frequency band spans from 866 Hz to 868 MHz.

Alternatively, the third electrode is disposed on the second side of the back surface of the dielectric substrate, which is opposite to the first side.

Alternatively, the third electrode has a Y-type shape, a T-type shape, a F-type shape, a mirror shape of the T-type or F-type shape.

Alternatively, the third electrode comprises a first part coupled to the first electrode and the grounding electrode respectively and a second part coupled to the second electrode and the grounding electrode respectively, both of which are coupled to or not coupled to each other.

Alternatively, the first and the second parts of the third electrode are disposed on the same side of the dielectric substrate, or they are disposed on the different sides of the dielectric substrate.

Alternatively, the dielectric substrate is a ceramic block or a high frequency dielectric-slab.

Alternatively, the first and the second electrodes may be rectangles, circles, ovals, triangles, folding lines, or curves.

The RFID tag as provided herein is able to work at two frequency bands, that is to say, it has dual-resonance. Moreover, the miniaturized dual-resonance RFID tag as provided herein contacts with the metal objects on its back surface when it needs to be adhered to the metal objects. That is to say, the side of the grounding electrode contacts with the metal objects while all of other surfaces except for the side of the grounding electrode do not contact with the metal objects. Therefore, the RFID tag as provided herein possesses good reading and writing performance, i.e., excellent anti-metal property, which can be used under metal or non-metal environments with great adaptability. In addition, utilization of the dielectric substrate with low loss and high dielectric constant, e.g., ceramic block or high frequency dielectric-slab, could reduce the size of the tag.

DETAILED DESCRIPTION OF THE INVENTION

Several aspects of the invention are described below in details by reference to appended drawings and specific embodiments. The skilled in the art should understand that the embodiments are set forth to provide an illustration, rather than limit the scope of the present invention. The scope of the present invention is limited by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Figure 1:
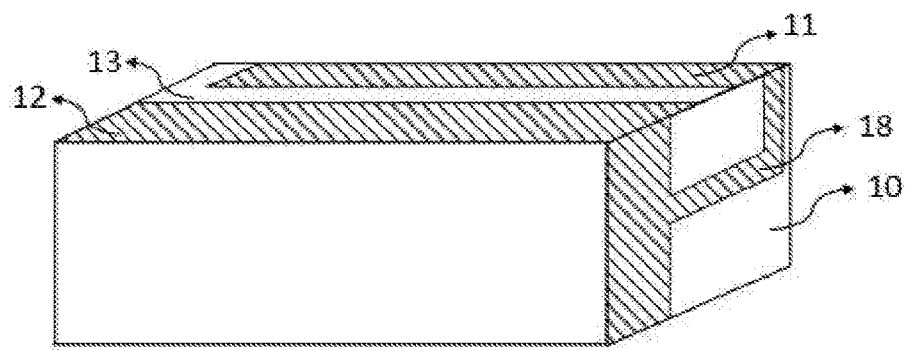
FIG. 1 is a three-dimensional structure diagram for illustrating the miniaturized dual-resonance anti-metal RFID tag according to one embodiment as described herein.
Figure 2:
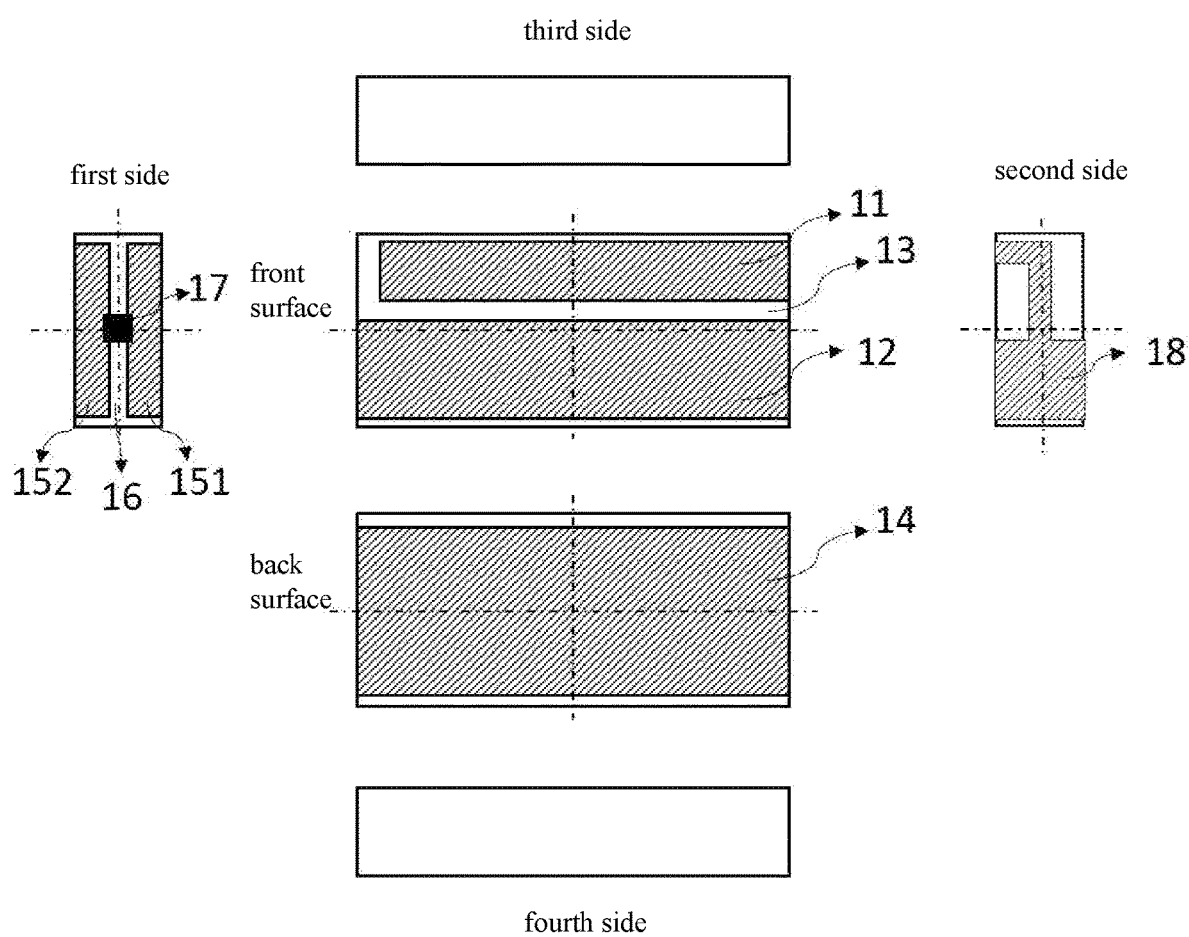
FIG. 2 is a structural schematic diagram of each side of the miniaturized dual-resonance anti-metal RFID tag as shown in FIG. 1.

Referring to FIGS. 1 and 2, FIG. 1 is a three-dimensional structure diagram for illustrating the miniaturized dual-resonance anti-metal RFID tag according to one embodiment as described herein. FIG. 2 is a structural schematic diagram of each side of the miniaturized dual-resonance anti-metal RFID tag as shown in FIG. 1. The miniaturized dual-resonance anti-metal RFID tag as provided herein comprises a dielectric substrate 10, and a microstrip antenna disposed on the surface of the dielectric substrate 10. The microstrip antenna comprises a first electrode 11 and a second electrode 12 disposed on the front surface of the dielectric substrate with a first slit 13 disposed therebetween. The first electrode 11 is not coupled to the second electrode 12 at the first slit 13. The microstrip antenna further comprises a grounding electrode 14 disposed on the back surface of the dielectric substrate, a feeding electrode disposed on the first side of the dielectric substrate and comprising a first feeding electrode 151 and a second feeding electrode 152 with a second slit 16 disposed therebetween. The first feeding electrode 151 is not coupled to the second feeding electrode 152 at the second slit 16. A driving chip 17 is provided at the second slit 16, which is coupled to the first and the second feeding electrodes 151 and 152 respectively. The first feeding electrode 151 is coupled to the second electrode 12 and the second feeding electrode 152 is coupled to the grounding electrode 14. The microstrip antenna further comprises a third electrode 18 which is electrically coupled to the first electrode 11, the second electrode 12 and the grounding electrode 14, respectively. Alternatively, the dielectric substrate 10 is a ceramic block or a high frequency dielectric-slab with low loss and high dielectric constant.

Based on the radiation mechanism of the microstrip antenna, the RFID as provided herein has two working frequency bands. The first working frequency band is provided by the first electrode 11, and the first electrode 11, the grounding electrode 14 and the second electrode 12 are electrically coupled to each other by the third electrode 18. The first electrode 11 can be deemed as a coupling parasitic unit coupled to the ground and the coupling excitation for the first electrode 11 can be obtained from the second electrode 12 by the way of electromagnetic coupling, so as to achieve initiation of resonance of the first working frequency band. The actual tracing length of the first electrode 11 is configured as the current length of a quarter wavelength of the first working frequency band, such that the first electrode 11 works in the first working frequency band. The second working frequency band is provided by the second electrode 12. Based on the radiation mechanism of a quarter microstrip antenna, the actual tracing length of the second electrode 12 is configured as the current length of a quarter wavelength of the second working frequency band, that is to say, the actual tracing length of the second electrode 12 is adjusted to allow the second electrode 12 to work in the corresponding second working frequency band.

Figure 3:
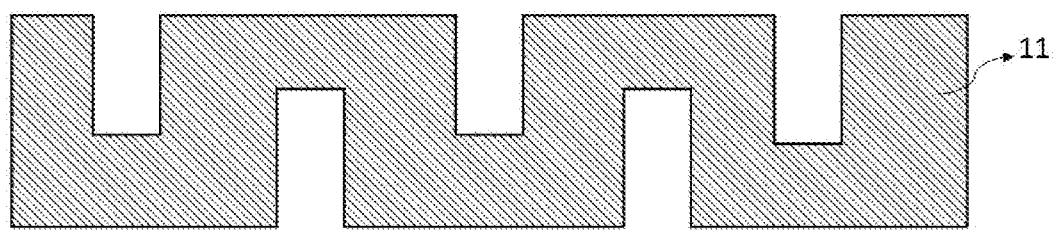
FIG. 3 is a structural schematic diagram for the first electrode.

The first working frequency band can be European band (866 Hz-868 MHz), or American band (902 MHz-928 MHz), or other working frequency bands, as long as the actual tracing length of the first electrode 11 is configured as the current length of a quarter wavelength of the first working frequency band. As shown in the structures of FIGS. 1 and 2, the first electrode is rectangle, whose shape can be varied to adjust the actual length of the first electrode. As shown in FIG. 3, the first electrode 11 can be folding lines and the actual length of the first electrode 11 is the sum of the length of respective segments of the folding lines. The first electrode 11 may have various shapes, such as circle, oval, triangle, curve and the like, for adjusting the actual length of the first electrode 11. Similarly, the second working frequency band can be European band (866 Hz-868 MHz), or American band (902 MHz-928 MHz), or other working frequency bands, as long as the actual tracing length of the second electrode 12 is configured as the current length of a quarter wavelength of the second working frequency band. The second electrode may have various shapes, such as rectangle, circle, oval, triangle, folding lines, curves and the like, for adjusting the actual length of the second electrode 12.

The miniaturized dual-resonance RFID tag as provided herein contacts with the metal objects on its back surface when it needs to be adhered to the metal objects. That is to say, the side of the grounding electrode 14 contacts with the metal objects while all of other surfaces (i.e., radiation surfaces) except for the side of the grounding electrode 14 do not contact with the metal objects. Therefore, the RFID tag as provided herein possesses good reading and writing performance, i.e., excellent anti-metal property, which can be used under metal or non-metal environments with great adaptability. In addition, utilization of the dielectric substrate with low loss and high dielectric constant, e.g., ceramic block or high frequency dielectric-slab, could reduce the size of the tag. The size of the tag as provided herein can be reduced to about 12*7*3 mm.

Figure 4:
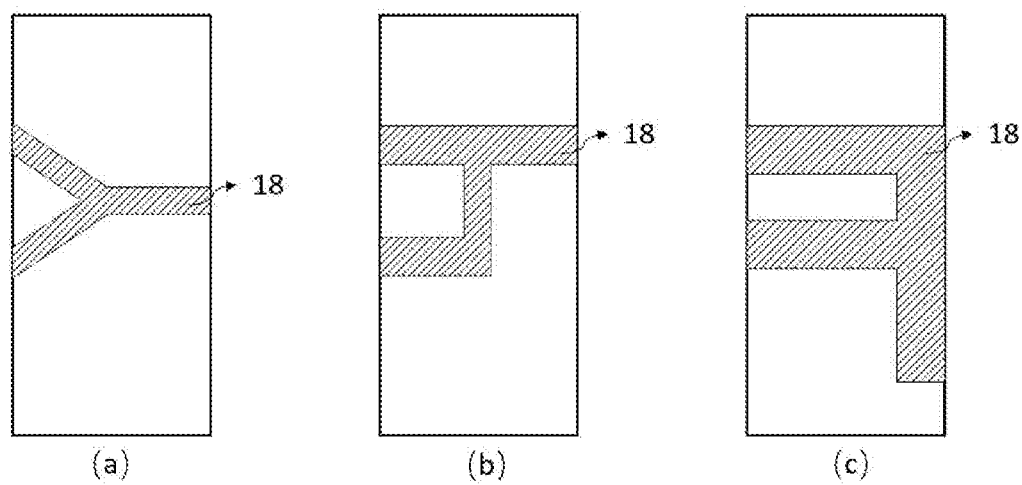
FIG. 4 is a structural schematic diagram for the third electrode according to one embodiment as described herein.
Figure 5:
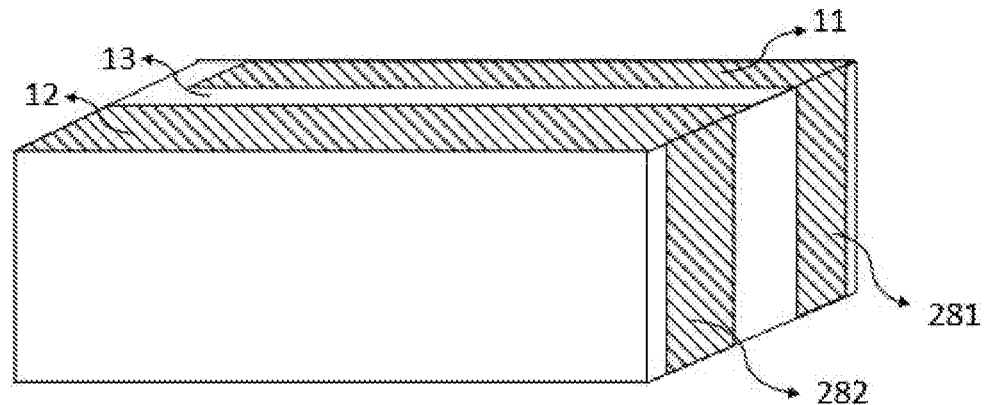
FIG. 5 is a structural schematic diagram for the third electrode according to another embodiment as described herein.
Figure 6:
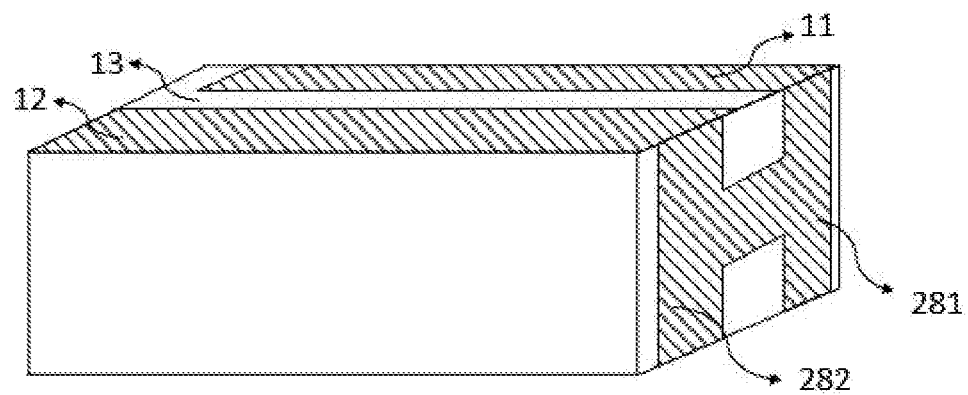
FIG. 6 is a structural schematic diagram for the third electrode according to still another embodiment as described herein.

In the example as shown in FIGS. 1 and 2, the third electrode 18 is disposed on the second side of the dielectric substrate 10, which is opposite to the first side. The third electrode 18 has a mirror shape of T-type shape. In other examples, the third electrode 18 may have other shapes, such as Y-type, T-type, F-type, a mirror shape of F-type shape and the like, as shown in FIG. 4. Referring to FIG. 5, in other embodiments, the third electrode comprises a first part 281 coupled to the first electrode 11 and the grounding electrode 14 and a second part 282 coupled to the second electrode 12 and the grounding electrode 14, both of which do not coupled to each other. The grounding electrode 14 is disposed on the back surface of the dielectric substrate (which is not shown in FIG. 5, but can be understood by the skilled in the art by referring to FIGS. 1 and 2). In FIG. 5, the first part 281 is not coupled to the second part 282. As shown in FIG. 6, in other embodiments, the first part 281 and the second part 282 can be configured as a shape for coupling the first part to the second part. In the structure as shown in FIGS. 5 and 6, the first and the second parts 281, 282 are disposed on the same side. In other embodiments, the first and the second parts of the third electrode may be disposed on the different sides of the dielectric substrate. The shape of the third electrode as shown in the Figures is not for exhausting and limiting the present invention, and may be various shapes without departing the scope of the present invention as long as the third electrode plays a role in electrically coupling the first and the second electrodes and the grounding electrode to each other.

The foregoing is provided for illustration, and does not intend to limit the present invention. Any changes and modifications for the above embodiments come within the scope of the present invention.

The invention claimed is:

1. A miniaturized dual-resonance anti-metal RFID tag, comprising a dielectric substrate and a microstrip antenna disposed on the surface of the dielectric substrate,
    wherein the microstrip antenna comprises:
    a first electrode and a second electrode disposed on the front surface of the dielectric substrate with a first slit disposed therebetween,
    a grounding electrode disposed on the back surface of the dielectric substrate,
    a feeding electrode disposed on the first side of the dielectric substrate and comprising a first feeding electrode and a second feeding electrode with a second slit disposed therebetween, and
    wherein:
    a driving chip is provided at the second slit, which is coupled to the first and the second feeding electrodes respectively,
    the first feeding electrode is coupled to the second electrode,
    the second feeding electrode is coupled to the grounding electrode, and
    the microstrip antenna further comprises a third electrode which is electrically coupled to the first and the second electrodes and the grounding electrode.

2. The miniaturized dual-resonance anti-metal RFID tag of claim 1, wherein the RFID tag has a first working frequency band and a second working frequency band.

3. The miniaturized dual-resonance anti-metal RFID tag of claim 1, wherein the first working frequency band spans from 866 Hz to 868 MHz, and the second working frequency band spans from 902 MHz to 928 MHz, or the first working frequency band spans from 902 MHz to 928 MHz, and the second working frequency band spans from 866 Hz to 868 MHz.

4. The miniaturized dual-resonance anti-metal RFID tag of claim 1, wherein the third electrode is disposed on the second side of the back surface of the dielectric substrate, which is opposite to the first side.

5. The miniaturized dual-resonance anti-metal RFID tag of claim 4, wherein the third electrode has a Y-type shape, a T-type shape, a F-type shape, a mirror shape of the T-type shape or a mirror shape of the F-type shape.

6. The miniaturized dual-resonance anti-metal RFID tag of claim 1, wherein the third electrode comprises a first part coupled to the first electrode and the grounding electrode respectively and a second part coupled to the second electrode and the grounding electrode respectively, and wherein the first part is coupled to or not coupled to the second part.

7. The miniaturized dual-resonance anti-metal RFID tag of claim 6, wherein the first and the second parts of the third electrode are disposed on the same side of the dielectric substrate, or the first and the second parts of the third electrode are disposed on the different sides of the dielectric substrate.

8. The miniaturized dual-resonance anti-metal RFID tag of claim 1, wherein the dielectric substrate is a ceramic block or a high frequency dielectric-slab.

9. The miniaturized dual-resonance anti-metal RFID tag of claim 1, wherein the first and the second electrodes have a shape of rectangle, circle, oval, triangle, folding line or curve.

* * * * *